Patented Dec. 26, 1939

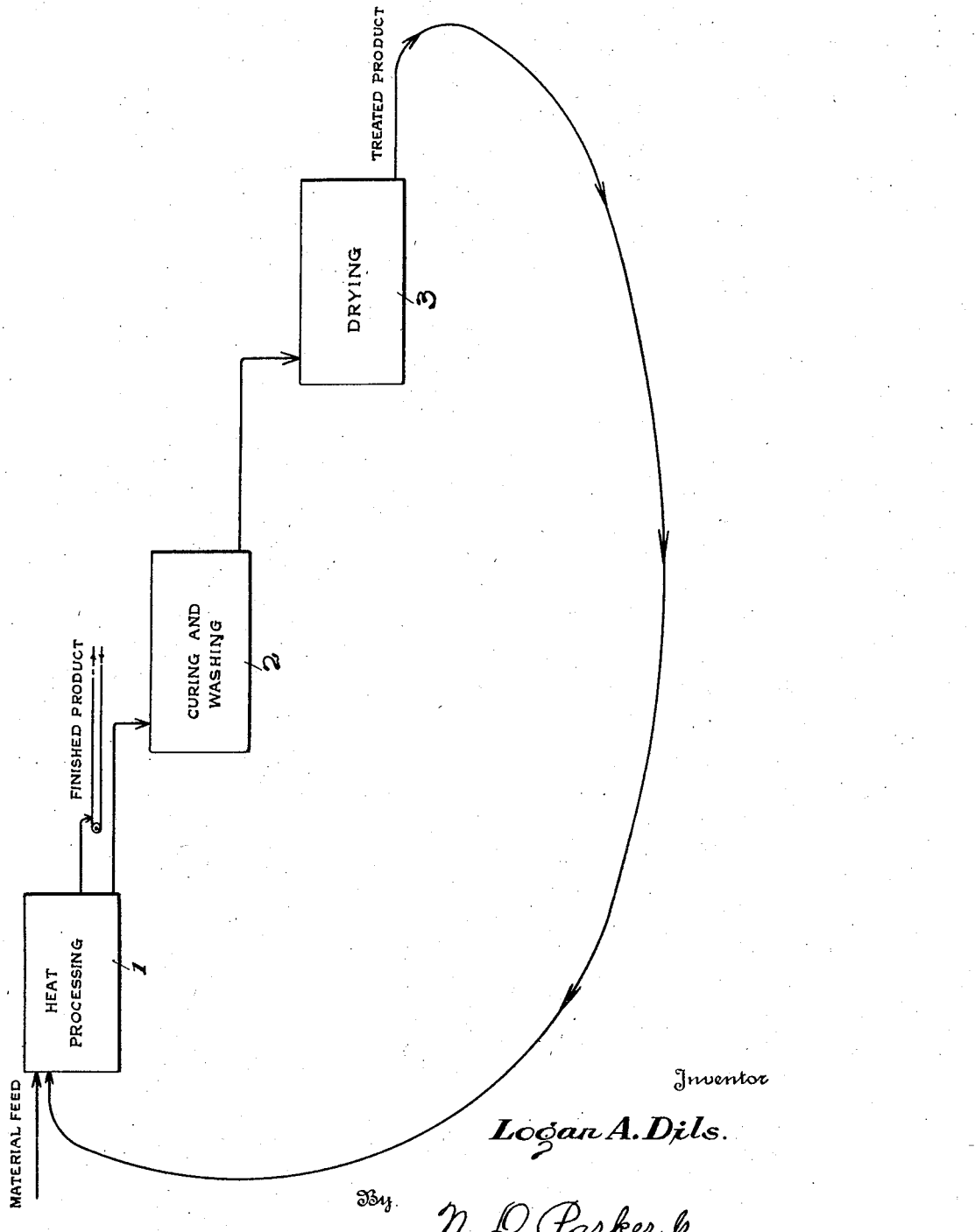

2,185,054

UNITED STATES PATENT OFFICE 2,185,054

PREPARATION OF CEREAL FOODS

Logan A. Dils, Stuttgart, Ark., assignor, by mesne assignments, of nine-twentieths to Robert M. Foster, Helena, Ark., one-half to H. S. Cramer, New York, N. Y., and one-twentieth to Douglas McCabe, Chicago, Ill.

Application August 20, 1937, Serial No. 160,075

11 Claims. (Cl. 99—80)

This invention relates to cereal foods and more particularly to a process for treating cereal grains to produce a ready-to-eat cereal or breakfast food.

One of the objects of the present invention resides in the provision of a novel process for treating cereal grains in order to obtain a ready-to-eat, puffed and toasted product containing all of the vital and nutritive properties of the grain, exceedingly crisp and having a pleasing flavor.

Another object of the invention resides in avoiding the use of added moisture during the cooking or heat-processing of the cereal grains undergoing treatment, thus serving to conserve and retain the essential vitamins, minerals and other beneficial food values contained in the grains.

Still another object is to provide in a process of the foregoing character, a novel method for quick-cooking the cereal grains with no more than their natural moisture content, by evenly imparting to the grains, a high temperature heat in such a manner that the grains are cooked in a comparatively short time interval.

A further object is to provide in a process wherein cereal grains are dry-cooked and thereafter flaked and dried, a novel treatment of the flaked and dried grains which resides in subjecting them to the action of a dry granular mixture heated to a high temperature whereby the grains are rapidly expanded, puffed and toasted and provide a delicious, crisp and wholesome cereal food.

A still further object comprehends the utilization of a dry mixture of chemical compounds heated to a high temperature for dry-cooking the cereal grains and for thereafter toasting and puffing the same after the cooked grains have undergone subsequent treatment.

Still another object is to provide a novel ready-to-eat cereal food product and process for making the same.

Other objects and novel features of the invention will appear more fully hereinafter from the following detailed description when taken in connection with the accompanying drawing wherein the various steps of the process of the present invention are diagrammatically illustrated.

Referring more particularly to Fig. 1, the cereal grains, such as natural brown rice for example, and having no more than their natural moisture content, are heat-processed at 1 by continuously agitating the grains with a dry mixture of chemical compounds, preferably granular in form for ease in initially mixing and subsequent handling. Prior to and during the heat treatment of the grains, the dry mixture is heated to a temperature of the order of 450°–575° F., depending upon the type of the grains, the moisture content thereof, as well as the atmospheric conditions, and during the treatment, the dry mixture is continuously agitated with the grains so that the same intimately surrounds each grain and evenly heats the latter on all sides thereof. Preferably the agitation of the dry mixture and grains is such that a fresh supply of the heating medium is conducted to and over the grains, the agitation effecting a continuous sifting or dispersing of the granular material through the grains so that the material is returned to the original supply and maintained at the temperature stated above. Thus, it will be understood that while the grains are agitated, a continuous supply of the heated mixture is sifted therethrough, thoroughly mixed with the grains in commingled relation in order to impart heat thereto, and is returned to the source. The high heat thus imparted to the grains on all sides thereof rapidly converts the moisture contained therewithin to steam, which in escaping from the interior of the grain through the outer coating, serves to weaken the latter and effects a cracking or splitting of the same. This steam passes off into the atmosphere, it being pointed out that the entire heat-treating processing step is conducted at atmospheric pressure. In view of the high temperature quickly imparted to the grains, substantially the entire content of starch is dextrinized while the oils are oxidized and thus conditioned beyond the rancidity point whereby the preserving qualities of the product are greatly enhanced.

The composition of the mixture utilized in the heat-processing described above may be such that 100 parts by weight is constituted substantially as follows:

| | |
|---|---|
| Sodium chloride anhydrous | 91.50 to 82.50 |
| Potassium chloride anhydrous | 3.00 to 5.00 |
| Calcium chloride anhydrous | 2.00 to 3.50 |
| Calcium phosphate tribasic | 1.00 to 2.00 |
| Ferrous sulphate (grayish-white) | .50 to 1.00 |
| Lithium chloride | .50 to 1.00 |
| Calcium carbonate | .50 to 3.00 |
| Magnesium carbonate | 1.00 to 2.00 |

Each of the aforementioned ingredients is preferably in granular form in order to facilitate the initial mixing and for ease in handling the mixture during its use. Moreover, the melting point of each constituent is of a sufficiently high order that the mixture is indestructible at such temperatures as are used in the process. The mixture hence may be utilized over and over again for treating successive batches of cereal grains. In initially mixing the ingredients, a small percentage of magnesium carbonate is utilized in order to prevent the mixture from becoming lumpy due to the absorption of atmospheric moisture. Upon initially heating the mixture, the magnesium carbonate burns off but its absence thereafter will not prevent the recurring use of the mixture, even should the latter be cooled and utilized again.

It will be observed from the above that the basic salts form the greater part of the mixture, sodium and potassium chloride being preferred because of their preservative qualities. Preferably, these chlorides should be of the anhydrous form in order to eliminate the troublesome effects of moisture in initially mixing the ingredients. The calcium chloride content, above indicated, is sufficient, under ordinary atmospheric conditions met in practice to serve as a drying agent to prevent the mixture from becoming caked or lumpy, although it will be understood that the proportion may be varied in accordance with existing atmospheric moisture conditions. The calcium phosphate tribasic serves as a clarifying and neutralizing agent and also possesses the characteristic of balancing the color of the material such as rice or other cereal grains. In addition to the basic chlorides above mentioned, a small amount of ferrous sulphate, grayish-white, is preferably added as a preservative and purifier, this amount having been found to be sufficient to purify and preserve any substance being treated which may border on perishability. The lithium chloride reduces and neutralizes any sharp organic odors resulting from the heat-processing while the calcium carbonate balances the free fatty acids in the vegetable or animal fats contained in the treated food material, due to possible rancidity or other factors.

During the aforementioned heat-processing step, the cereal grains, such as hulled natural brown rice for example, are expanded approximately twice their normal size by reason of the generation and escape of steam from the grains and the dextrinization of substantially the entire starch content. The high heat employed kills and sterilizes the seed germ and renders the grain weevil-proof. The various ingredients of the mixture intimately agitated with the grains moreover impart thereto the desirable characteristics mentioned above.

After the completion of the heat-processing step at 1, as above outlined, the grains thus treated are cured and washed and during this latter step of the process, the grains are flaked and further expanded or puffed and all of the remaining free starch is abstracted therefrom. The curing operation, referring to Fig. 1, takes place at 2 and a suitable type of non-rusting, corrosion-proof tank or vat is employed into which the treated grains are placed. The tank is then filled with a relatively weak aqueous solution of sodium chloride, the solution having a specific gravity of substantially 3 to 8 degrees Baumé, and the grains are permitted to soak in this solution for a period of from 8 to 10 hours, depending upon the cereal grain to be treated and depending also upon atmospheric moisture conditions. Due to the use of sodium chloride in the curing process, the specific gravity of the water is raised to such an extent that the remaining free starch abstracted from the grains remains in suspension and may thus be readily drawn off at the end of the curing operation. This starch may subsequently be recovered as a valuable by-product of the process by suitably evaporating the washing or curing solution. The sodium chloride solution further acts as a preservative and prevents the grains from souring during the curing step. It is sometimes advisable in hot weather, for example, to add to the curing solution one-tenth of one per cent of sodium salicylate in order to prevent any tendency toward fermentation or oxidation.

As the grains become saturated in the curing tank, they swell and burst into a flaked condition and all of the starch remaining undextrinized is abstracted and is maintained in suspension for subsequent recovery. After the grains have been subjected to the action of the saline solution for the period of time above indicated, they are thoroughly washed in order to remove any free starch adhering thereto and are then subjected to a drying treatment at 3, see Fig. 1.

At 3, the saturated and flaked grains are exposed to a relatively low temperature of the order of 140°–160° F. for a length of time, depending upon the material being processed. In the case of rice grains for example, the length of the drying operation is approximately two to three hours, it being pointed out that the drying is conducted slowly and proceeds to the point where the moisture content is reduced to substantially zero or to that which would correspond to the existing atmospheric conditions. In practice it has been found that with natural brown rice, for example, drying the same to a moisture content of between 3 and 8 per cent produces very satisfactory results. It will be understood that any suitable type of dryer may be employed in this step of the process such as a flight dryer, shelf dryer, vacuum dryer, rotary dryer or vat dryer.

When the treated grains, as for example, natural brown rice, are dried as above stated, the resultant product is in the form of a light brown, flaked substance which is approximately three to four times the size of the original grain. The product is moreover of a slightly puffed nature and rough in appearance.

After the grains have been subjected to the treatment heretofore outlined, the same, after the drying process at 3 has been completed, are again subjected to the action of the heated dry mixture of chemical compounds in order to puff, expand and toast the grains. This subsequent and final treatment is effected in the same manner as the treatment of the original grains, that is the dried, flaked grains are intimately agitated with the mixture, while the temperature of the latter is maintained between 450°–575° F. During this step, the product, due to the explosion of the starch cells, is further puffed and expanded to a size approximately six to eight times the original size of the grain, thereby producing a product provided with an internal cellular structure and having a light brown rough outer surface. The heat-processing or toasting step materially increases the calorific value of the material and is continued only so long as is necessary to effect puffing, expanding and toasting of the grains. In processing natural brown rice in accordance with the above, it has been found that in practice, the final heat-processing treatment, when continued for thirty to ninety seconds, is sufficient to thoroughly puff, expand and toast the product. It will be understood, however, that the toasting treatment may be conducted for a longer time interval, depending upon the cereal grain being processed, the atmospheric moisture conditions and the desired color of the finished product. The material, after the final heat-processing above mentioned is conducted from I, by a suitable conveying apparatus to a point where the same may be packaged or otherwise handled for distribution.

From the foregoing, it will be understood that the present invention provides a novel process for treating natural brown rice and other cereal grains to produce a crispy, ready-to-eat cereal product, rich in vitamins and other food qualities, as well as being extremely palatable when eaten dry, mixed with milk or cream, employed in confections or utilized in various other manners as a food. The dry-cooking of the grains by the utilization of the dry mixture of chemical compounds insures that the nutritive and beneficial food qualities of the grains will be retained, while the ingredients of the mixture employed impart a preserving quality to the product, thus rendering it possible to keep the same for an indefinite period without danger of deterioration. In addition to the above, the final toasting or heat-processing step appreciably increases the calorific value of the grains, thus producing a highly beneficial food product.

While the heat-processing treatment of the grains may be performed by any suitable apparatus, it being borne in mind that the essential characteristic of the treatment resides in sifting or dispersing the dry heated material through the cereal grains and continuously agitating the latter with the material, it is preferred to employ a machine such as that disclosed in the application of Logan A. Dils, Serial Number 160,074, filed August 20, 1937, for Process and Composition for Treating Food Materials. Reference is also made to this latter application, wherein certain subject matter disclosed herein is set forth and claimed.

It will be understood that various changes may be made in the process herein disclosed, without departing from the spirit of the invention, as well understood by those skilled in the art. Reference will therefore be had to the appended claims for a definition of the limits of the invention.

What is claimed is:

1. The process of making a ready-to-eat cereal food product, comprising subjecting cereal grains having no more than their natural moisture content to a dry heat by mixing the grains with a granular mixture heated to a temperature of the order of 450°–575° F., soaking the same in an aqueous solution for a time sufficient to effect swelling and bursting of the grains, heating the product to reduce the moisture content of the same to a value of from 3 to 8 per cent, and thereafter agitating the product with the granular mixture, heated to a relatively high temperature in order to toast the same.

2. The process of treating cereal grains which comprises mixing the same with a dry granular mixture heated to a temperature of the order of 450° to 575° F., curing the grains in a relatively weak aqueous saline solution for a time sufficient to effect a flaking of the grains, then subjecting the saturated grains to the action of heat of the order of 140°–160° F. in order to dry the grains, and thereafter mixing the product with said granular mixture heated to a temperature ranging from 450°–575° F. in order to toast the product.

3. The process of making a ready-to-eat cereal food product, comprising agitating cereal grains in intimate contact with a dry mixture of chemical compounds heated to a temperature of the order of 450°–575° F., subjecting the grains for a period of from 8 to 10 hours to the action of a relatively weak solution of sodium chloride to effect swelling and bursting of the grains and to abstract the free starch therefrom, thereafter drying the saturated grains, and then mixing the dried grains with the heated mixture to puff and expand the same.

4. The process of making a ready-to-eat cereal food product, comprising agitating cereal grains in intimate contact with a dry mixture of chemical compounds heated to a temperature of the order of 450°–575° F., curing the dry heated grains in an aqueous solution for a length of time sufficient to enable bursting of the grains due to moisture absorbed from the solution, drying the bursted grains, and thereafter heating the dried grains to cause them to become puffed and enlarged by subjecting them to the action of said heated mixture.

5. The process of treating cereal grains which comprises subjecting the same to the action of a dry granular material heated to the order of 450°–575° F. in order to cook and crack the grains, curing the cracked grains in an aqueous solution for a length of time sufficient to enable swelling and bursting of the cracked grains by reason of moisture absorbed from the solution, slowly drying the bursted grains and reducing the moisture content thereof to a value of from 3 to 8 per cent, and thereafter toasting the dried grains by subjecting them to the action of said heated material.

6. The process of treating cereal grains which comprises dry-cooking the same for an appreciably short period of time by continuously mixing therewith a dry granular physical mixture of chemical compounds, approximately ninety to ninety-five per cent of the mixture being composed of salts of sodium, potassium and calcium, the mixture being heated to a temperature ranging from 450°–575° F., soaking the cooked grains in a weak aqueous saline solution for a period of time approximating 8 to 10 hours, in order to flake the grains, washing the grains, evaporating the moisture content of the grains down to from 3 to 8 per cent, and thereafter puffing and expanding the grains by mixing them with said heated mixture.

7. The process of treating cereal grains which comprises dry-cooking the same at atmospheric pressure by dispersing and sifting therethrough a granular mixture of chemical compounds heated to a temperature of the order of 450°–575° F., the chlorides of sodium and potassium constituting approximately ninety per cent of the mixture, treating the cooked grains with an aqueous solution containing sodium chloride to effect a flaking thereof, washing the grains, subjecting the same to heat of the order of 140°–160° F. in order to remove a substantial part of the moisture content, and thereafter mixing the grains with the heated mixture to produce a puffed and toasted product.

8. The process of treating cereal grains which comprises dry-cooking the same at atmospheric pressure by dispersing and sifting therethrough a granular mixture of chemical compounds heated to a temperature of the order of 450°–575° F., the chlorides of sodium and potassium constituting approximately ninety per cent of the mixture, treating the cooked grains with an aqueous solution containing sodium chloride in order to flake the grains, washing the grains, drying the same to remove a substantial part of the moisture content, and thereafter toasting the grains by agitating the same with the said heated mixture.

9. The process of treating cereal grains which comprises dry-cooking the same at atmospheric pressure by dispersing and sifting therethrough a granular mixture of chemical compounds heated to a temperature of the order of 450°–575° F., the chlorides of sodium, potassium and calcium constituting from ninety to ninety-five per cent of the mixture, soaking the cooked grains in an aqueous solution of sodium chloride, the solution having a specific gravity ranging from 3 to 8 degrees Baumé for a time sufficient to effect swelling and bursting of the grains, washing the grains, drying the grains to substantially reduce the moisture content, and thereafter mixing the grains with said heated mixture to toast the same.

10. The process of making a puffed, and expanded, ready-to-eat rice food product comprising dry-cooking rice grains by continuously mixing therewith a dry granular mixture of chemical compounds heated to a temperature of the order of 450°–575° F., the mixture including salts of sodium, calcium and potassium, carbonates of calcium and magnesium, calcium phosphate and sulphate of iron, changing the form of the cooked grains by subjecting the same to the action of a relatively weak solution of sodium chloride for a time sufficient to cause flaking of the grains, thereafter drying the grains in order to substantially reduce the moisture content, and finally puffing the grains by mixing them with said heated mixture.

11. The process of making a puffed and expanded ready-to-eat rice, food product comprising rapidly heating the rice grains with no more than their natural moisture content to effect dextrinization of substantially the entire starch content and to cause a cracking of the outer coating of the grains, by continuously agitating therewith, a dry mixture of chemical compounds heated to a high temperature, subjecting the cracked grains to the action of an aqueous solution of sodium chloride to abstract and hold in suspension the remaining free starch content of the grains, and to effect a swelling and bursting of the latter, washing the grains, drying the same to substantially reduce the moisture content thereof, and thereafter subjecting them to the heated mixture to puff the same.

LOGAN A. DILS.